(12) United States Patent
Massie

(10) Patent No.: US 6,590,208 B2
(45) Date of Patent: Jul. 8, 2003

(54) BALANCED MOMENTUM PROBE HOLDER

(75) Inventor: James R. Massie, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 0 days.

(21) Appl. No.: 09/766,555

(22) Filed: Jan. 19, 2001

(65) Prior Publication Data

US 2002/0096642 A1 Jul. 25, 2002

(51) Int. Cl.[7] .............................................. G01N 13/12
(52) U.S. Cl. ......................................... 250/306; 73/105
(58) Field of Search ................................ 250/306, 307; 73/105

(56) References Cited

U.S. PATENT DOCUMENTS

| | | | |
|---|---|---|---|
| 4,600,854 A | * | 7/1986 | Bednorz et al. ............ 310/331 |
| 5,262,643 A | * | 11/1993 | Hammond et al. ......... 250/306 |
| 5,266,801 A | | 11/1993 | Elings et al. |
| 5,412,980 A | | 5/1995 | Elings et al. |
| 5,415,027 A | * | 5/1995 | Elings et al. ................. 73/105 |
| 5,519,212 A | | 5/1996 | Elings et al. |
| 5,714,682 A | | 2/1998 | Prater et al. |
| 6,073,484 A | * | 6/2000 | Miller et al. .................. 73/105 |
| 6,078,044 A | * | 6/2000 | Yasutake et al. ............ 250/306 |
| 6,100,523 A | * | 8/2000 | Gupta et al. ................ 250/306 |

* cited by examiner

*Primary Examiner*—Bruce Anderson
(74) *Attorney, Agent, or Firm*—Patterson, Thuente, Skaar & Christensen, PA.

(57) ABSTRACT

A balanced momentum probe holder in an apparatus for characterizing a sample surface has first and second members each having extensible and retractable distal ends. The distal ends extend or retract substantially simultaneously in response to a signal from a detector thus balancing the momentums of the first and second members and reducing the net momentum of the probe holder to essentially zero. Balancing the momentum of the probe holder reduces parasitic oscillations in the apparatus thus enhancing performance.

18 Claims, 8 Drawing Sheets

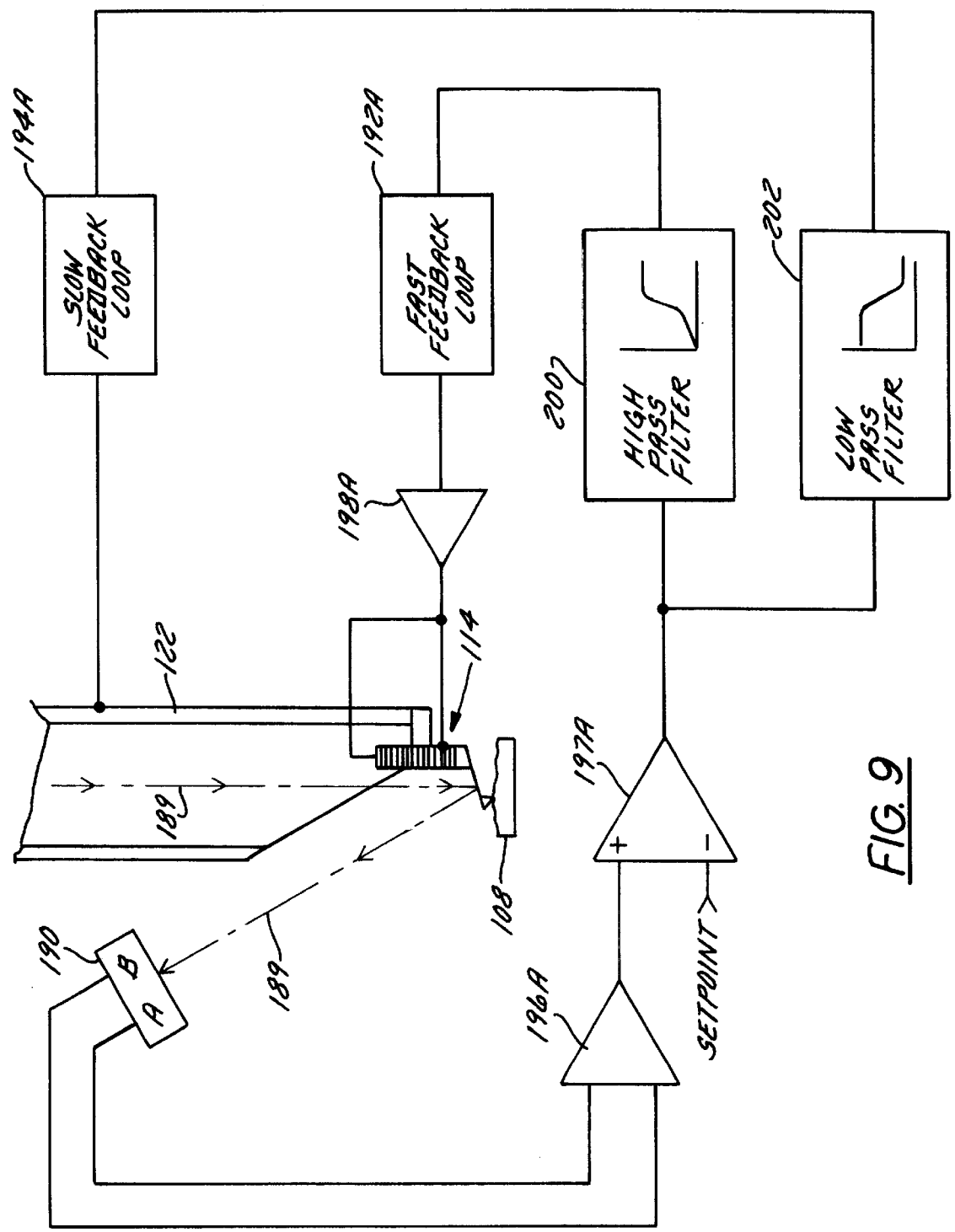

BALANCED MOMENTUM PROBE HOLDER

FIELD OF THE INVENTION

The present invention is generally directed to a balanced momentum probe holder for use in metrology systems, especially scanning probe microscopes used to measure sample surfaces down to the nanometer level. Specifically, the invention is directed to such systems employing nested-Z and non-nested parallel feedback loops, to achieve rapid, and highly accurate scanning of a sample surface. The invention also relates to methods of using such a probe holder in such systems.

BACKGROUND OF THE INVENTION

The ongoing miniaturization of components of a variety of devices makes high-resolution characterization of critical surfaces increasingly important. In the field of metrology, for example, surface-characterization devices such as stylus profilers and scanning probe microscopes (SPM) are routinely used to measure topography and other characteristics of critical samples. Stylus profilers and scanning probe microscopes are in fact frequently used as inspection tools to measure the critical surfaces of industrial devices like semiconductor chips and data storage devices during and after the manufacturing process. To be economically feasible, these profilers and scanning probe microscopes must complete their measurements as quickly, accurately, repeatably and as reliably as possible. The accuracy, precision, reproducibility, and reliability of such metrology instruments are especially critical in view of the ongoing desire that such surface-characterization instruments be capable of quickly and accurately characterizing dimensions smaller than those of the products and devices being fabricated, to assure manufacturing quality, and to provide accurate diagnoses of manufacturing problems. Because critical features continue to shrink in the manufacturing process, it is necessary to improve the accuracy and the speed of scanning probe microscopes and stylus profilers to keep up with the measurement demand.

For the sake of convenience, the discussion that follows and throughout this patent specification will focus on Atomic Force Microscopes (AFMs). In this regard, it shall be understood that problems addressed and solutions presented by the present invention shall also be applicable to problems experienced by other measurement instruments including surface-modification instruments and micro-actuated devices.

The typical AFM includes a probe which includes a flexible cantilever and a stylus mounted on the free end of the cantilever. The probe is mounted on a scanning stage that is typically mounted on a common support structure with the sample. A typical scanning stage may include an XY actuator assembly and a Z actuator, wherein "X" and "Y" represent what is typically the horizontal XY plane, and "Z" represents the vertical direction. "X" and "Y" and "Z" are mutually orthogonal directions. The XY actuator assembly drives the probe to move in an X-Y plane for scanning. The typical Z actuator, mounted on the XY actuator and providing support for the probe, thus drives the probe to move along a Z axis which is disposed orthogonally relative to the X-Y plane. (The definition of the XYZ axes is convenient and typical, but the choice of axis name and orientation is of course arbitrary.)

AFMs can be operated in different sample-characterization modes including contact-mode and Tapping™ mode. In contact-mode, the cantilever stylus is placed in contact with the sample surface, cantilever deflection is monitored as the stylus is scanned over the sample surface, and the resulting image is a topographical map of the surface of the sample. In Tapping™ mode (a trademark of Veeco Instruments, Inc.) sample characterization, the cantilever is oscillated mechanically at or near its resonant frequency so the stylus repeatedly taps the sample surface or otherwise interacts with the sample. See, e.g., U.S. Pat. Nos. 5,266,801; 5,412,980; and 5,519,212 to Elings et al., which are illustrative.

In either sample-characterization mode, the interaction between the stylus and the sample surface induces a discernable effect on a probe-based operational parameter, such as the cantilever deflection oscillation amplitude, the phase or the frequency, all of which are detectable by a sensor. In this regard, the resultant sensor-generated signal is used as a feedback control signal for the Z actuator to maintain a designated probe operational parameter constant.

In contact-mode, the designated parameter may be cantilever deflection. In Tapping™ mode, the designated parameter may be oscillation amplitude, phase or frequency. The feedback signal also provides a measurement of the surface characteristic of interest. For example, in Tapping™ mode, the feedback signal may be used to maintain the amplitude of cantilever oscillation constant to measure the height of the sample surface or other sample characteristics.

In analyzing biological samples, polymers, photoresist, metals and insulators, thin films, silicon wafer surfaces, and other surfaces, the ability to accurately characterize a sample surface is often limited by the present ability of an AFM to move the stylus vertically relative to the surface at a rate sufficient to accurately measure the surface while scanning in either the X or Y direction. This ability is inadequate in present day devices for essentially two reasons.

In order to accurately measure the height of all features, both large and small, on a sample surface, the Z actuator must have the ability to displace the stylus connected thereto over a large range of heights, i.e., it must have large vertical travel. This necessitates that the Z actuator, whether it is a scanning tube such as is on this assignee's Dimension series AFM heads or is a flexure such as is on this assignee's Metrology series AFM heads, must be large enough to move the stylus up and down sufficiently to measure even the largest surface features.

Unfortunately, a necessary by-product of a larger Z actuator having greater range is associated greater mass which makes the actuator movement relatively slow. Slow actuators are not able to move the probe rapidly enough in Z while scanning in X or Y at anything more than modest speed without damaging the probe or sample or without sacrificing measurement accuracy. Because it is important while scanning to minimize the force of the stylus on the sample to prevent damage to the stylus and/or sample, the scan rate in X or Y must, of necessity, be reduced to a speed compatible with the Z actuator's ability to move the stylus up and over surface features without slamming into them, which is obviously undesirable. One present day technique to overcome this limitation and increase responsiveness of the Z-actuator is to increase the gain of its feedback loop. This works only to a limited degree because if the gain is increased more than a modest amount, the Z actuator begins to resonate and that resonance is passed into the AFM, creating parasitic oscillations, which in turn ruin image quality. In essence, a large mass, large displacement Z actuator cannot be made to overcome its inherent physical limitations.

In another approach, one does not attempt to wring more performance from the large Z actuator than it is inherently able to deliver. Instead, a separate "fast" Z actuator is used, with its own feedback loop, to move the stylus quickly over small surface variations that the large Z actuator is too slow to react to, which enables one to obtain relatively high quality imaging at even high scan speeds. The fast Z actuator is smaller than and hence of significantly smaller mass than the slow Z actuator. As a result it is advantageously driven in its own (or shared) fast feedback loop at speeds exceeding that of the slow Z actuator.

Unfortunately, at high gain, the high speed of operation and momentum of the fast Z actuator can similarly cause parasitic oscillations which reduce image quality. A device and method which balances these inertial forces created by a fast Z actuator would be of great benefit and commercial interest.

OBJECTS AND SUMMARY OF THE INVENTION

It is an object of the present invention to provide a novel balanced momentum probe holder for scanning probe microscopes and/or stylus profilers that permits the probe to measure the height of small surface features better than is presently possible with commercially available tools. It is specifically an object to provide such a probe holder for an improved atomic force microscope (AFM).

Another object of the present invention is to provide a novel AFM that permits more accurate imaging of surface features at high scan rates.

Still another object of this invention is to provide an AFM that can measure surface features at high scan rates without inducing parasitic oscillations in the AFM.

A further object of this invention is to balance the momentum created by the fast Z actuator in an AFM to allow fast actuation without driving parasitic oscillations.

Yet another object of this invention is to provide a fast actuator of sufficiently low mass to allow its use on the lower end of a scanning stylist AFM.

Yet a further object of this invention is to provide an AFM with fast actuation optimized for operation in nested or parallel feedback loops.

These and other objects are achieved according to the present invention by providing a new and improved AFM having a probe holder that includes a separate, fast Z actuator assembly operated in a fast feedback loop and that balances the momentum of the fast Z actuator assembly. The basic idea is to balance the momentum of the moving probe holder with the momentum of a counterbalance moving in synchronization with the probe holder, but in the opposite direction. In this case, the net momentum of the fast Z-actuator assembly is essentially zero, and thus the motion of the probe does not substantially excite parasitic resonances of the supporting structure and/or XYZ scan assembly. The fast Z actuator assembly is also of low mass and is therefore able to displace the probe in the Z direction more rapidly than a larger, higher mass conventional Z actuator which is part of the piezo tube or the flexure upon which the fast Z actuator assembly is mounted. In order to take advantage of the small size and low mass of the fast Z actuator assembly, it is operated in a fast feedback loop, either nested with the feedback loop of the conventional Z actuator or in a parallel feedback loop. The combination of a low mass fast Z-actuator and the balanced momentum enables extremely accurate scanning of even the smallest surface features and even at high scan speeds where conventional Z actuators perform sluggishly.

The present invention, then, is generally directed to an apparatus having a probe for characterizing a surface of a sample. The apparatus may have an X actuator, a Y actuator and a first Z actuator as in an AFM but may also have only a Z actuator such as in a profilometer. The apparatus also has a second Z actuator assembly with the probe mounted on it. The second Z actuator assembly is coupled to the first Z actuator. The second Z actuator assembly is less massive and therefore quicker responding than the first Z actuator. When actuated to move the probe, the momentum of the second Z actuator assembly is balanced so that its motion does not transmit substantial vibration to other actuators or support members.

The fast Z actuator assembly comprises first and second fast Z-actuators, sometimes referred to herein as the bottom actuator and the top actuator, respectively. The two actuators are arranged so that the fixed ends are attached to a common central support. Then the top end of the top actuator and the bottom end of the bottom actuator are both free to move. The measurement probe, for example an AFM cantilever probe, is attached directly or through intermediate mounting to the bottom or distal end of the bottom actuator which is proximate the sample. A counterbalance mass is attached to the top or distal end of the top actuator. The top and bottom fast Z-actuators are arranged so that they move in a synchronized manner, but in opposite directions. The probe mount, actuators, and counterbalance mass are arranged to match the momentum carried by the top and bottom actuators. In the simplest case the mass of the top actuator is the same as the mass of the bottom actuator and the mass of the counterbalance mass matches the mass of the probe mount. Then the two actuators are arranged to move substantially the same distance (in opposite directions) at the same time. Since the motions are the same but opposite and the masses are matched, the net momentum is essentially zero, thus transmitting no vibration to surrounding members. In more complicated arrangements, the momentum can be matched by arranging a top actuator with say half the motion of the bottom actuator, but twice the moving mass, or suitable variations thereof that match combinations of velocity and mass of the top and bottom fast Z-actuators.

In one embodiment, the first, bottom actuator includes a first piezo stack disposed between the common central support and the probe mount assembly, and the second, top actuator includes a second piezo stack disposed between the counterbalance and the common central support.

In yet another embodiment, the balanced momentum probe holder is incorporated into a nested feedback control system. In still another embodiment, the balanced momentum probe holder is incorporated into a non-nested parallel feedback control system.

In both feedback systems, when an error signal to move the probe vertically is sent to the fast Z actuator assembly, the first piezo stack extends or retracts to move the probe to the desired height while, simultaneously, the second piezo stack extends or retracts also. The momentum of the second piezo stack and its associated components balances the momentum of the first piezo stack and associated components including the probe.

As a result, the net momentum, and therefore the net force acting upon the larger system is eliminated, thereby eliminating or substantially reducing parasitic oscillations. In a nested feedback control system, the error signal is processed by a control device such as a PID controller and sent to the fast Z actuator assembly to cause it to move the probe. Any residual error signal is sent to the slow Z actuator assembly to cause it to move the probe an additional amount needed. In this way, the probe is able to track, and therefore measure the height of surface features that are quite small, even at high scan speeds, while also being able to measure larger surface features as well.

BRIEF DESCRIPTION OF THE DRAWINGS

A clear understanding of the above-summarized features and advantages of the present invention as well as various environments and fields-of-use of the invention, as is presently contemplated by the instant inventor, including the construction and operation of conventional components and mechanisms associated with the present invention, will become more readily apparent to one skilled in the art by referring to the exemplary, and therefore non-limiting, embodiments illustrated in the following drawings which accompany and form a part of this patent specification.

FIG. 9 is a schematic illustrating another preferred embodiment of a method and apparatus for characterizing a sample surface.

Throughout the drawings, like reference numerals refer to like parts.

DETAILED DESCRIPTION

As suggested above, sample surfaces may be characterized by using probe-based instruments such as scanning probe microscopes, stylus profilers, or any other instrument capable of obtaining, recording, and manipulating sample surface information. While all of these applications are within the scope of the present invention, the preferred embodiment describes the invention as included in an Atomic Force Microscope (AFM) but does not exclude other SPMs.

Figure 1:
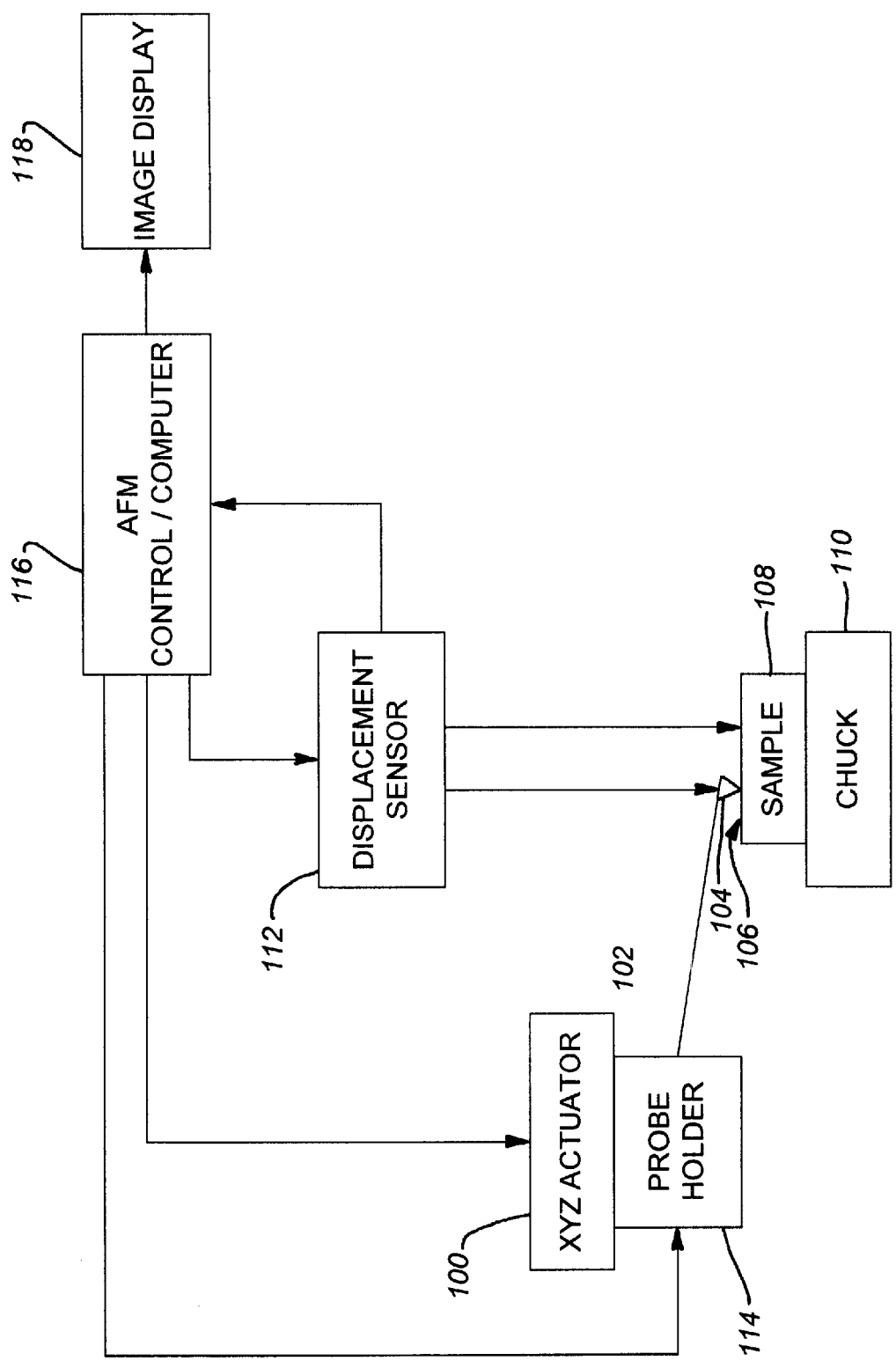
FIG. 1 is a schematic illustrating a preferred method and system for controlling the relative distance between a probe and a sample surface. The illustrative system depicted in FIG. 1 includes an atomic force microscope, a personal computer, and a display device operably coupled to the personal computer for visually displaying information characterizing the surface sample.

An AFM-based system which incorporates the balanced momentum probe holder of the present invention and which is capable of acquiring sample surface data, recording the surface data, and manipulating the data to perform desired tasks is schematically illustrated in FIG. 1.

The AFM-based system (FIG. 1) includes an XYZ actuator 100 to which a cantilever arm 102 is operatively connected. A stylus 104 is mounted on the other end of the cantilever 102 for characterizing a surface 106 of a sample 108 releasably affixed to chuck 110.

A displacement sensor 112 detects movement of the stylus 104 above the surface 106 and provides a signal that is related to a measured property of the sample surface, for example the shape of the sample surface. The output of the displacement sensor is sent to an AFM control/computer system 116 as is well known in the art. The control system 116 outputs scan and control signals to the XYZ actuator 100. AFMs are usually operated in a mode that attempts to maintain (and often minimize) a constant tracking force between the stylus 104 and the sample surface 106. This is usually accomplished by arranging a feedback loop to keep the output of the displacement sensor constant as the XYZ actuator scans the probe, and therefore the stylus, over an area of interest on the sample surface. To maintain the constant tracking force, the Z portion of the XYZ actuator 100 is raised up and down. In the current invention, this vertical motion is accomplished by either the Z portion of the XYZ actuator or the balanced momentum probe holder 114, or both, by raising or lowering the stylus 104 relative to the sample surface 106.

The displacement sensor 112 includes a laser and a photodetector, both of which will be discussed in detail below in connection with FIGS. 8 and 9. Signals from the displacement sensor 112 may, for example, be used to determine the deflection, oscillation amplitude, frequency, or phase or similar parameter of the cantilever 102 and stylus 104 when they are moving in proximity or in contact with the sample surface 106. An image-display device 118, operatively connected to the personal computer 116, is able to display video images in response to a signal from the personal computer 116. The computer also typically stores the sample images for later viewing and analysis.

Figure 2:
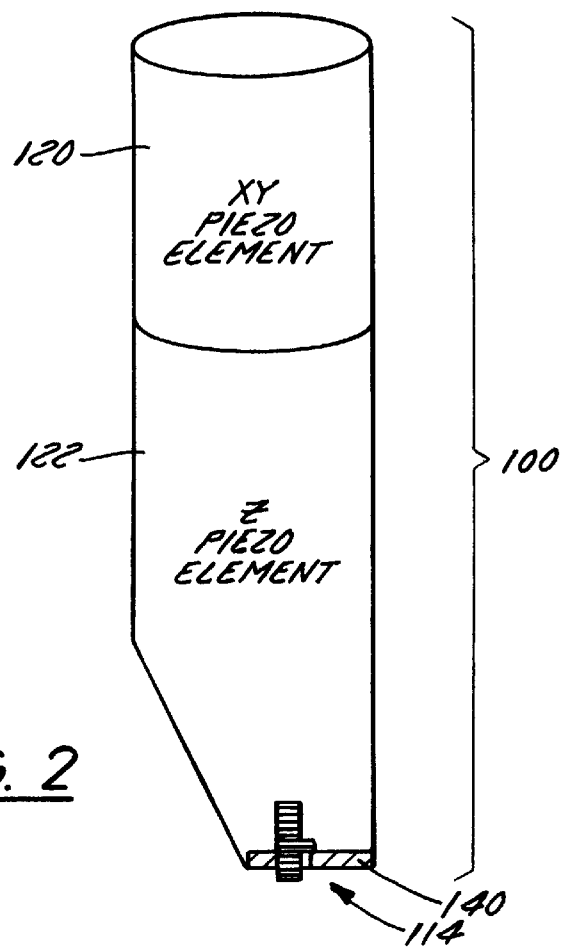
FIG. 2 is a view depicting select elements from FIG. 1 on an enlarged scale.

FIG. 2 is a side view illustrating the balanced momentum probe holder 114 of the present invention mounted on the XYZ actuator 100, in the form of a scanning tube as is referred to by this assignee as a Dimension tube scanner. The XYZ actuator 100 is a standard piezo tube scanner and includes a conventional XY actuator 120 consisting of cylindrical X and Y piezo elements and a Z actuator 122 consisting of a cylindrical Z piezo element. XY actuator 120 is adapted to move the stylus 104 relative to the sample surface 106 in the "X" and "Y" directions. Z actuator 122 is adapted to move the stylus 104 relative to the sample surface 106 in the "Z" (i.e., height) direction. The balanced momentum probe holder 114 is mounted on the lower end of Z actuator 122.

Figure 3:
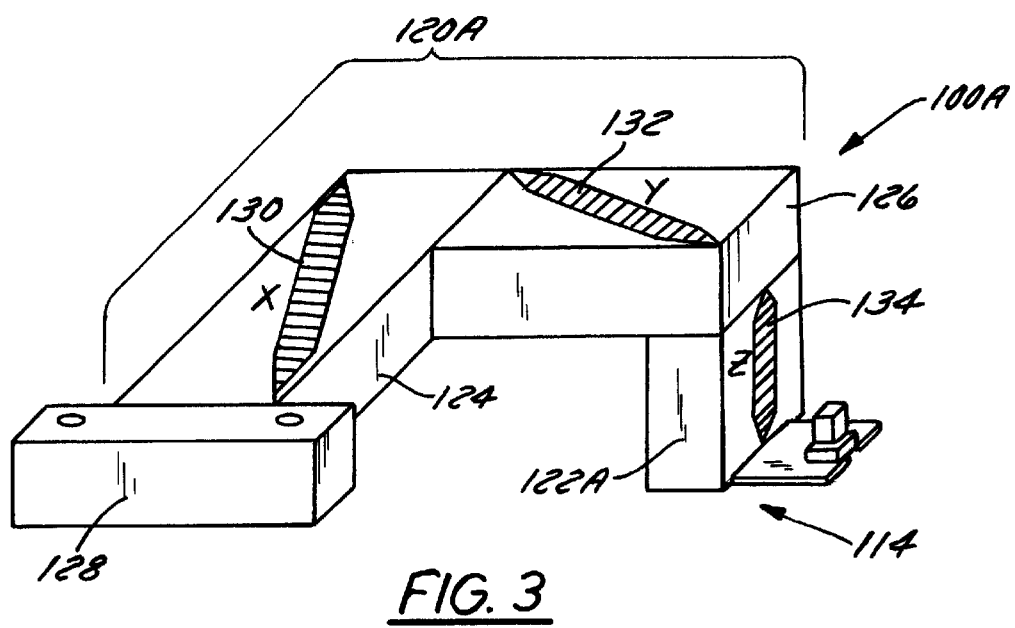
FIG. 3 is a schematic depicting an alternate embodiment of the present invention.

FIG. 3 is a schematic of another embodiment of an XYZ actuator 100A, in the form of a flexure, referred to by this assignee as a Dimension Metrology scanner with which the inventive probe holder 114 may be used. Components of a preferred embodiment of XY actuator 120A include an X actuator 124 and a Y actuator 126. A Z actuator 122A is mounted on Y actuator 126, Y actuator 126 is mounted on X actuator 124, and X actuator 124 is mounted on a connector 128, for connecting the XYZ actuators 124, 126, and 122A to an apparatus for characterizing a surface of a sample.

The balanced momentum probe holder 114 is mounted on the lower end of the Z actuator 122A. Each of the X, Y and Z actuators 124, 126, and 122A includes a respective piezo element or stack 130, 132, 134 mounted within respective flexures for moving the probe holder 114 relative to the sample surface as is standard. For this purpose, the X direction actuator piezo stack 130 and the Y direction actuator piezo stack 132, are each diagonally mounted respectively within their X, Y flexures 124, 126 while the Z direction piezo stack 134 is mounted in the Z direction within its flexure 122A as shown. In operation, a respective piezo element or stack 130, 132, 134 is energized, causing such piezo stack 130, 132 and/or 134 to expand or contract, bending its respective flexures for moving the balanced momentum probe holder 114 relative to the surface 106 of the sample 108.

Figure 4:
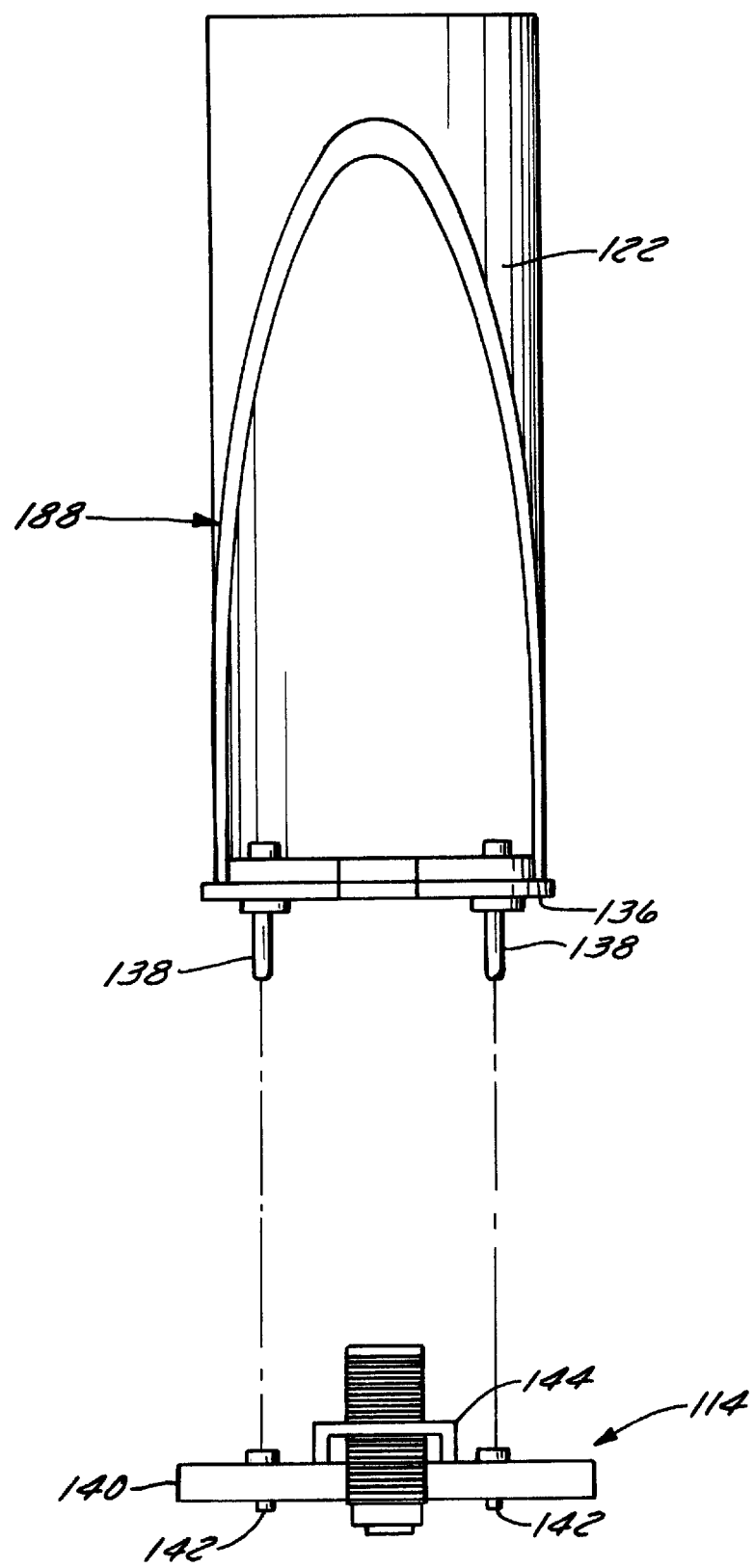
FIG. 4 is a view depicting select elements from FIG. 2 on an enlarged scale.
Figure 5:
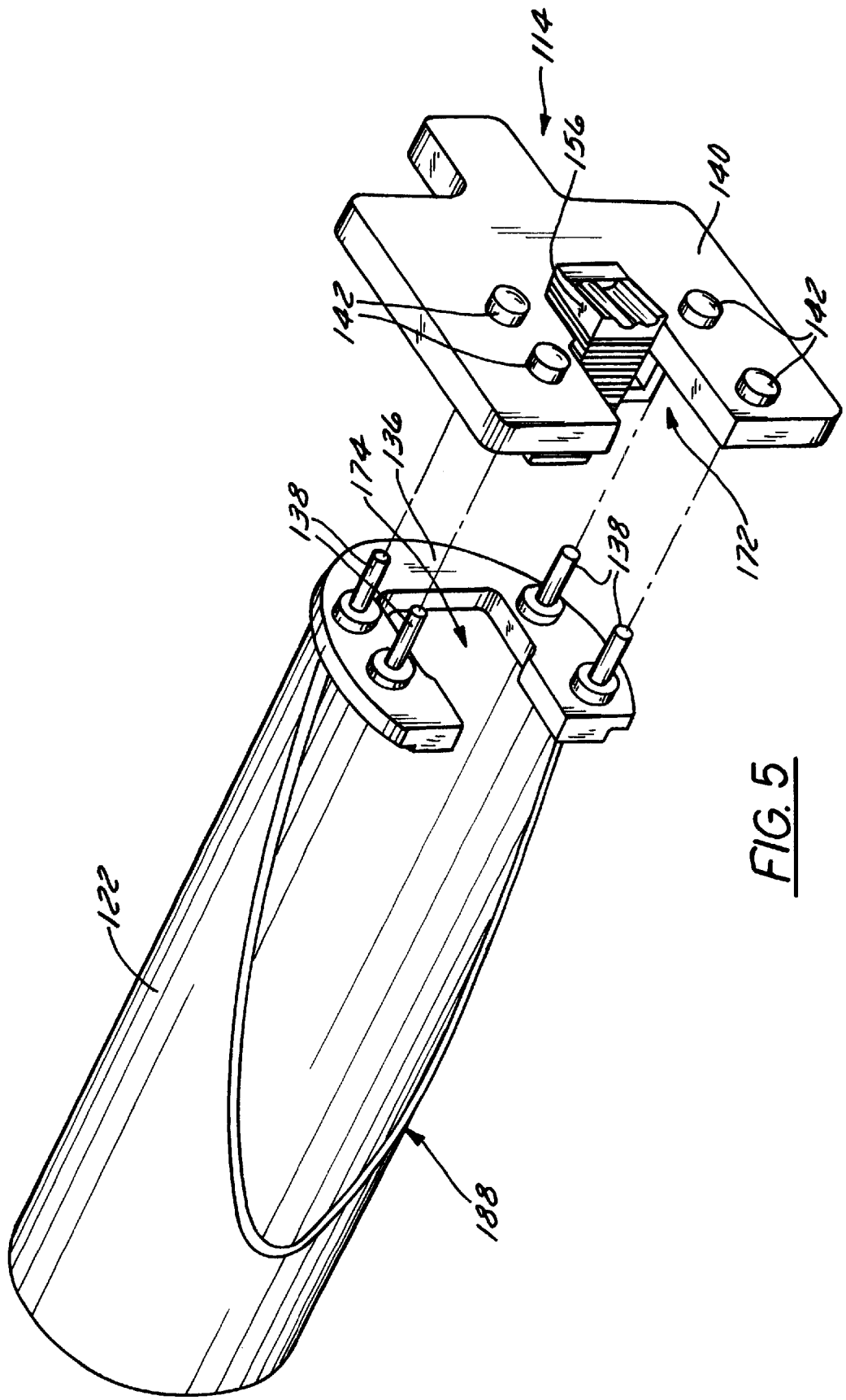
FIG. 5 is a perspective view based on FIG. 4, and on an enlarged scale relative to FIG. 2.

FIGS. 4 and 5 depict the Z actuator 122 of the piezo tube scanner as an elongated, hollow tube of conventional Z piezo material. A lower end portion 136 of the Z actuator 122 includes a plurality of pins 138 extending away from the end portion 136 of the Z actuator 122. The novel balanced momentum probe holder 114 includes a base or holder 140 which defines a corresponding plurality of apertures, or sockets, 142 dimensioned for receiving the pins 138 and for operatively connecting the Z actuator 122 and the base 140 together. Further in this regard and referring to FIG. 5, the base 140 defines a central, open portion 172 through which other components 146, 154 (described in detail below) of the probe holder 114 pass. Still further, the end portion 136 of the Z actuator 122 preferably includes a corresponding central, open portion 174 into which the probe holder 114 is disposed when actuator 100 is joined to the balanced momentum holder 114, as shown in FIG. 5.

Figure 6:
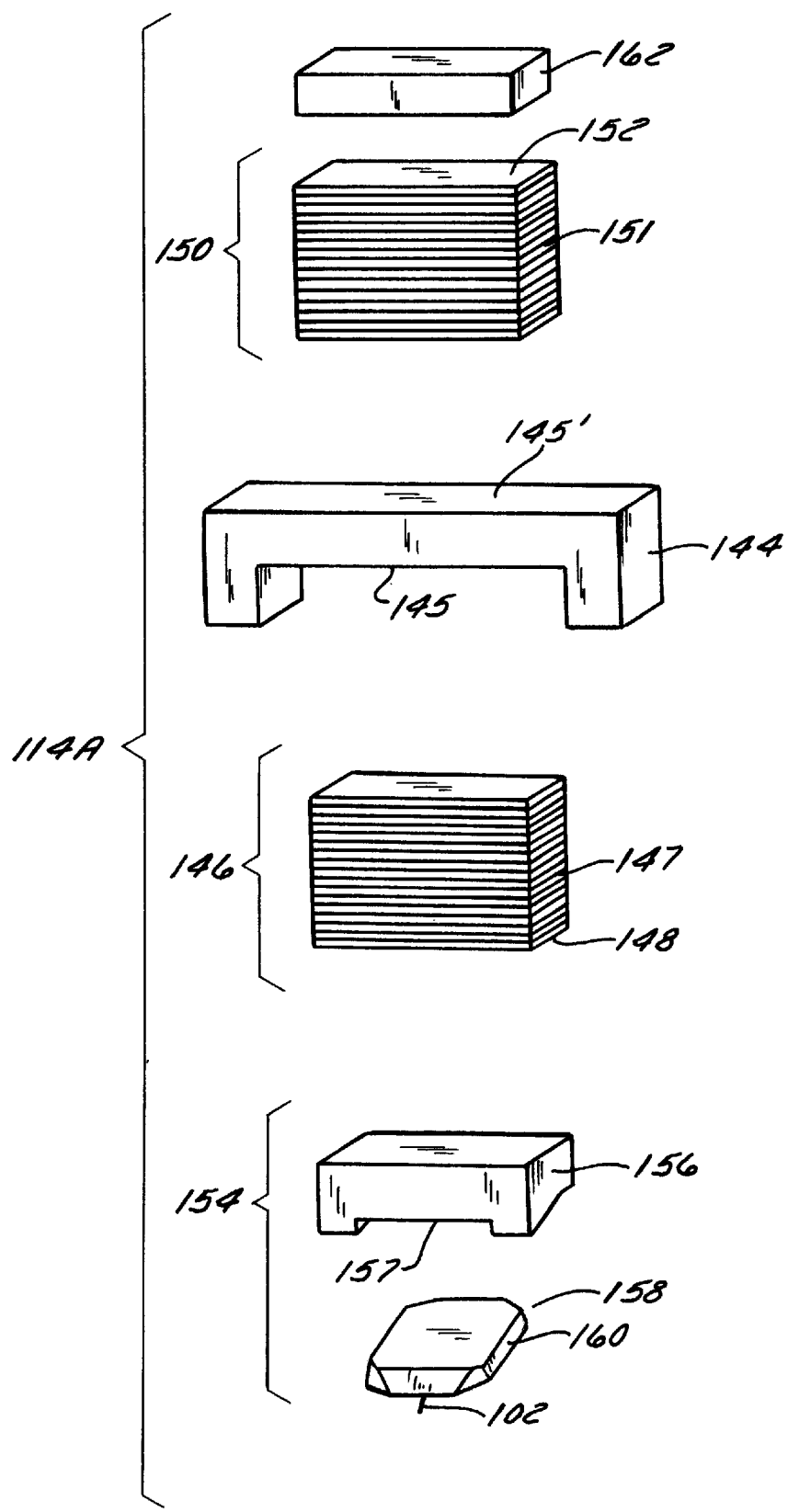
FIG. 6 is an exploded perspective view, based on FIG. 4 and on an enlarged scale, presenting one embodiment of the balanced momentum probe holder of the invention.
Figure 7:
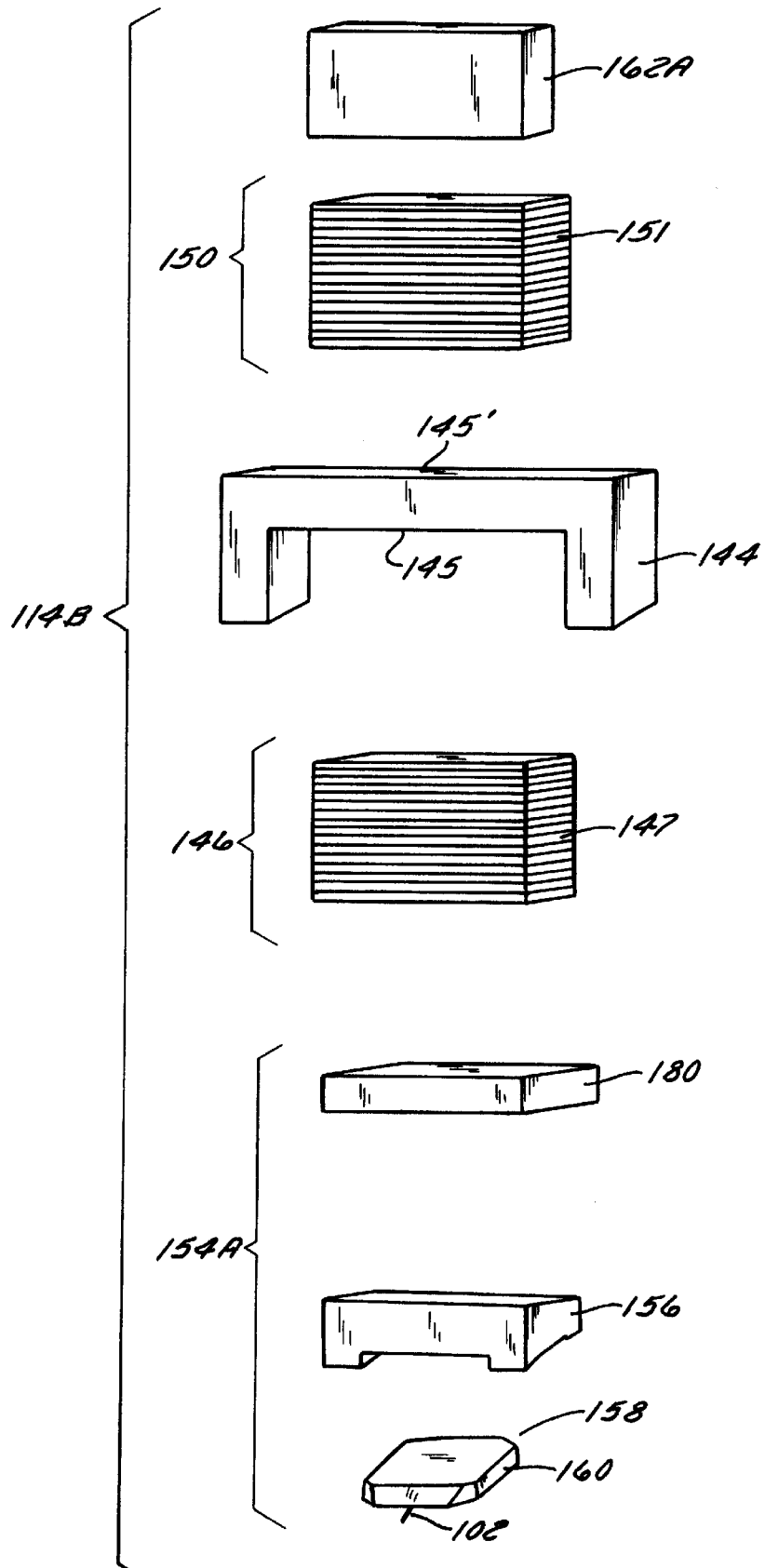
FIG. 7 is an exploded perspective view, based on FIG. 4 and on an enlarged scale, presenting another embodiment of the balanced momentum probe holder of the invention.

FIGS. 6 and 7 are exploded perspective views, based on FIGS. 2 and 4, and on an enlarged scale relative thereto, presenting a preferred embodiment of the balanced momentum probe holder of the present invention. The illustrated embodiment of the balanced momentum probe holder 114A of the present invention comprises the holder or base 140 (FIG. 5) connected to the actuator 100, and a common central support 144 connected to the holder or base 140. The base or holder 140 is not shown in FIG. 6 for purposes of clearly presenting the remainder of the components or elements of the first preferred embodiment of the balanced momentum probe holder 114 of the present invention.

The balanced momentum probe holder 114A further comprises a first member 146 which preferably comprises a piezo stack 147. The first member 146 is carried by the common central support 144, in a central recessed portion 145 of the support. The first piezo stack 147 has a distal end 148 disposed toward the sample and which is extensible and retractable in the Z axis. The probe holder 114A further comprises a second member 150 which also preferably comprises a piezo stack 151. The second member 150 is carried on the opposite side 145' of the common central support 144. The second piezo stack 151 has a free end 152 disposed away from the sample and which is extensible and retractable in the Z direction.

First and second member 146 and 150 may alternatively comprise other piezo actuators such as piezo electric tubes or piezo electric bimorphs. First and second members 146, 150 may also comprise voice coil actuators, electrostatic actuators, electrorestrictive actuators or magnetorestrictive actuators, or other suitable actuators.

The first and second actuator assemblies 146 and 150 each has a mass that is selected to provide minimal weight to the probe holder 114A yet achieve the desired sample surface characterization effect. In operation, the free ends 148 and 152 of the first and second actuator assemblies 146 and 150 either both extend or both retract synchronously in response to a signal from a detector, as is described in detail below. Moreover, in the preferred embodiment the masses of the first and second actuator assemblies 146 and 150 are substantially equal, to balance the momentum of the piezo stacks 147 and 151 during operation of the balanced momentum probe holder 114A during surface characterization of a sample 108. In an alternate embodiment, the mass of the actuator assemblies can be different if the range of travel of the two actuators is different. For example, the upper actuator assembly 150 may have twice the mass of the lower actuator assembly 146 if the upper actuator assembly is arranged to move half the distance of the lower actuator assembly. Other effective combinations having matched mass times velocity products may be used as appropriate.

Probe holder 114A further comprises a probe mount assembly 154 carried by the free end 148 of the lower actuator assembly 146. Probe mount assembly 154 comprises a probe mount 156 and a cantilever probe 158 carried by the mount 156, consisting of a cantilever substrate 160, and a cantilever arm 102 carried by the cantilever substrate, and disposed toward the sample. The cantilever probe 158 includes the cantilever arm 102 and stylus 104 (not shown), both of which are depicted in FIG. 1. Probe holder 114A further comprises a counterbalance 162 carried by the distal end 152 of the second member 150. The mount assembly 154 and counterbalance 162 have substantially equal masses or as indicated above are chosen to ensure that the momentums of the first and second actuator assemblies are balanced.

When assembled, alumina insulating layers (not shown) may be placed between common central support 144 and the first piezo stack 147, between the common central support 144 and the second piezo stack 151, and between the first piezo stack 147 and the probe mount 156. The insulating layers are not necessary especially if the common central support is nonconducting.

In operation, when activated by a Z actuation signal, each of the first and second piezo stacks 147, 151 will extend or retract in the Z direction (up or down by the conventional orientation and as oriented in the figures.) Further, the first and second piezo stacks 147, 151 are driven in opposite directions. This can be accomplished by orienting the piezo stacks so that the same control signal will cause them to move in opposite directions or by opposing control signals to two stacks that are oriented with the piezo polarity in the same direction. It may also be desirable to scale the control voltages going to each piezo stack to account for any difference in sensitivity (and therefore response) between the two piezo stacks. Accordingly, the momentum of extending and retracting actuator assemblies 146, 150 will be balanced, as will readily be appreciated by those skilled in the art.

Additionally, to achieve Tapping™ mode operation, or other A.C. imaging modes such as MFM (magnetic mode microscopy) a signal at a frequency substantially equal to the resonant frequency of the cantilever arm 102 is fed to the first piezo stack 147 in combination with the Z actuation driving signal fed to that stack. In this way, first piezo stack not only causes the stylus 104 to move in the Z direction but to oscillate at resonance and tap the sample surface, or otherwise obtain sample information by various A.C. imaging modes.

FIG. 7 is an exploded perspective view, presenting another embodiment of the balanced momentum probe holder of the invention. The base or holder 140 is not shown for purposes of clearly presenting the remainder of the components or elements of the second preferred embodiment of the balanced momentum probe holder 114B.

The balanced momentum probe holder 114B of FIG. 7 is similar to the above-discussed embodiment of the balanced momentum probe holder of the present invention with the addition of a separate tapping piezo element. Thus in FIG. 7, the first member 146 preferably includes a first piezo stack 147 disposed between the common central support 144 and the probe mount assembly 154A. Similarly, second member 150 includes a second piezo stack 151 disposed between counterbalance 162A and the common central support 144.

The mount assembly 154A illustrated in FIG. 7 further preferably includes an oscillation piezo element 180 which is disposed between the first piezo stack 147 and the probe mount 156. The oscillation piezo element 180 is typically used to oscillate the cantilever probe at or near its resonant frequency. Using a separate piezo element 180, excited with a signal at a frequency substantially equal to the resonant frequency of the cantilever arm 102, may provide additional robustness as compared to the apparatus of FIG. 6 which lacks a tapping piezo element and wherein tapping is achieved by combining the tapping signal with the fast Z actuation signal fed to the first piezo stack 147.

Insulators, though not necessary, may be used as before in addition to one on either side of oscillation-piezo element 180.

It should be noted that in the preferred embodiment the mass of the counterbalance 162A is substantially equal to the mass of the mount assembly 154A (which includes the tapping piezo element 180), to achieve the balanced momentum effect mentioned above. In an alternate embodiment, the masses of the counterbalance 162A and the probe mount assembly 154A can be different if the momentum of the assemblies are substantially balanced. For example if the counterbalance 162A had twice the mass of the probe mount 154A, the lower actuator would be moved roughly twice the distance of the upper actuator. Other effective combinations of mass and travel may be used as appropriate.

A suitable commercially available adhesive material is preferably used to adhesively bond adjacent components of the balanced momentum probe holder 114A, 114B together or not. Said components may also be soldered, welded, braised, mechanically constrained, clamped or held together by any other equivalent method.

Figure 8:
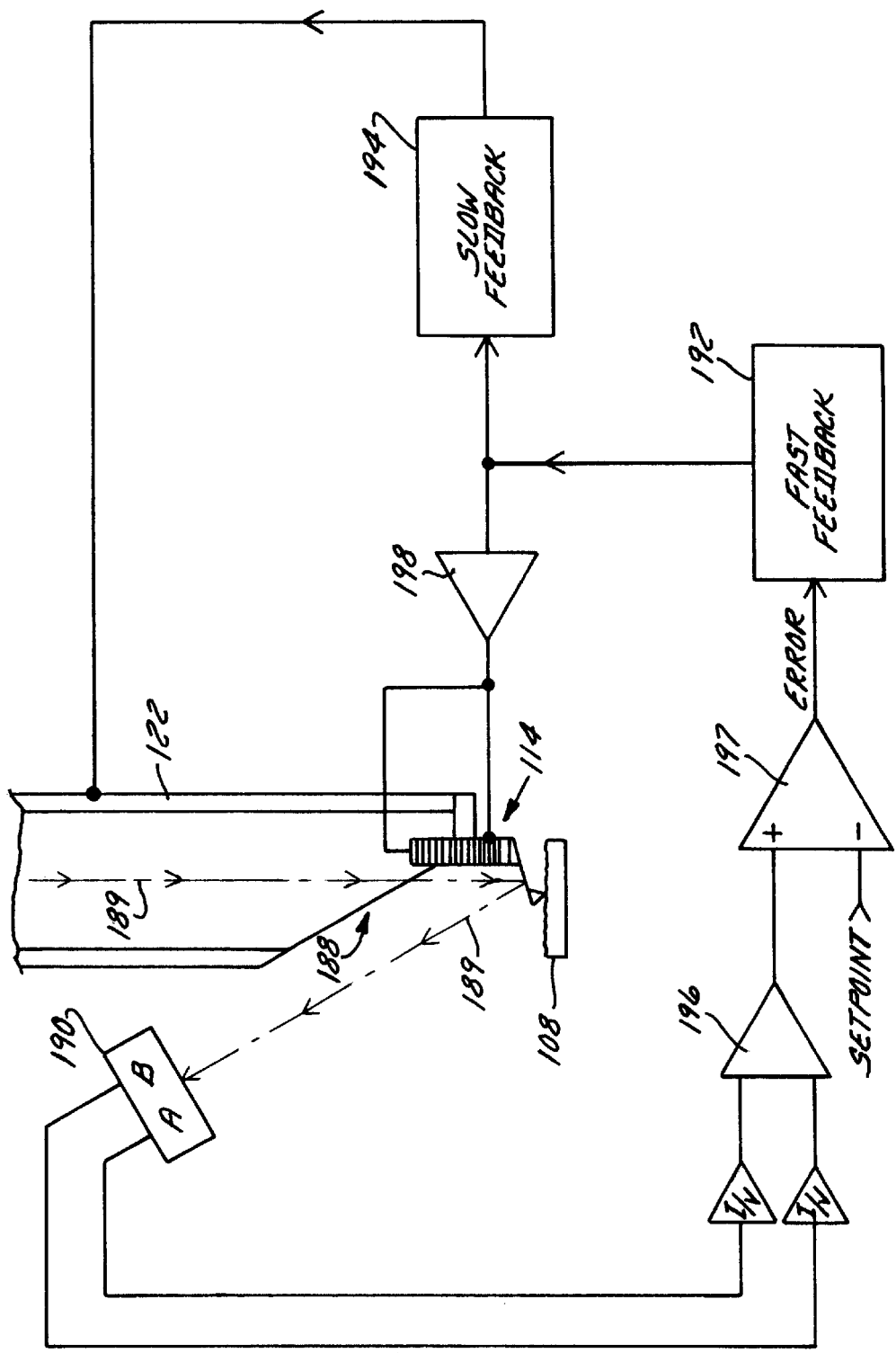
FIG. 8 is a schematic illustrating one preferred embodiment of a method and apparatus for characterizing a sample surface.

FIG. 8 is a schematic illustrating one preferred embodiment of a method and apparatus in FIG. 1. The illustrated apparatus, in operation, includes the XYZ actuator 100 (FIG. 2), wherein the Z actuator portion 122 of the XYZ actuator 100 is extendable both toward and away from sample 108, alternatively, for characterizing the surface 106. As mentioned above, one preferred Z actuator is an elongated, tubular, hollow Z actuator 122. (See FIGS. 4 and 5.) The side wall of the hollow Z actuator 122 includes a sufficiently large cut-out portion 188 such that a beam 189 of light from a source (not shown) such as a laser is able to pass longitudinally through the hollow Z actuator 122, reflect off the cantilever arm 102 of the balanced momentum probe holder 114, and pass to detector 190. The detector 190 is adapted to produce a signal which is correlatable to the magnitude of displacement or oscillation of the stylus 104.

FIG. 8 further depicts a nested feedback control system comprising the balanced momentum probe holder 114 discussed above, the detector 190, amplifier 196, difference amplifier 197, first and second control devices 192, 194, and optional amplifier 198. The first control device 192 is preferably a standard PID controller and is operatively connected to the output of the difference amplifier 197. Difference amplifier 197 has at its output the difference between the amplified output of the detector 190 and a set point voltage, as is standard. The first control device is connected to the first and second piezo stacks 147, 151 of the probe holder 114 through optional amplifier 198 for causing the distal ends 148, 152 of the first and the second piezo stacks 147, 151 to simultaneously extend or retract in response to the error signal from the amplifier 197 for moving the stylus 104 at a first predetermined rate either toward or away from the surface 106 of the sample 108. Simultaneous operation of the second piezo stack 151 with first piezo stack 147, balances the momentum generated by the piezo stack 147 when it extends or retracts. This advantageously eliminates unwanted detrimental parasitic oscillations in the device as a whole.

The second control device 194 is also preferably a PID controller, operably connected to the output of first control device 192 and input to the XYZ actuator 100 for causing the extendable Z actuator portion 122 of actuator 100 to move the stylus 104 of probe holder 114 at a second predetermined rate either toward or away from the surface 106 of the sample 108 when the entire error signal is not reduced to zero by operation of the piezo stacks 147 and 151 of the probe holder 114, as discussed below.

The first predetermined rate is greater than the second predetermined rate. In other words, the first piezo stack 147 (the fast Z actuator) of the balanced momentum probe holder 114 moves the stylus 104 toward and away from the sample 108 faster than does the Z actuator 122. This is possible because the probe holder 114 is significantly less massive than the Z actuator 122 and because the fast feedback loop operates at higher speed relative to the slower feedback loop of the Z actuator 122. The fast feedback loop comprises, operably coupled: the detector 190, the amplifier 196, the difference amplifier 197, the first controller 192, the optional amplifier 198 and the first piezo stack 147. The fast feedback loop operates at higher speed relative to the slower feedback loop of the Z actuator 122. The slower feedback loop comprises, operably coupled: the detector 190, the amplifier 196, the difference amplifier 197, the first controller 192, the second controller 194 and the slow Z actuator 122. The probe holder 114, by design, thus balances the momentum of its opposing ends, which is of significant interest because it keeps stray oscillations from probe holder 114 from coupling into the actuator 100 and the remainder of the apparatus.

By current design, for the apparatus illustrated in FIGS. 8 and 9, the maximum range of travel for the Z actuator 122 in the direction toward and away from surface 106 is approximately 15 micrometers, and the maximum range of travel for the first piezo stack 147 of the probe holder 114 in the direction toward and away from the sample surface 106 is approximately 1 micrometer. Because the range of travel of the probe due to the first piezo stack of the probe holder 114 is limited to about 1 micrometer, it may not be able to move the probe the required amount to, for instance, clear a surface feature that is more than 500 nanometers high, which is about one-half of the total travel of the first piezo stack 147. In this situation, the error signal from difference amplifier 197 is not reduced to zero and a residual error signal will be input to the second control device 194 which will output a signal to the slow Z actuator 122 to move the probe the additional amount required to track or clear the surface feature being scanned.

Preferably, the residual error signal input to the second control device 194 will be such as to cause the Z actuator 122 to keep the stylus 104 in the middle of the range of travel (1 micrometer) of the first piezo stack 147 on which the cantilever probe 158 including cantilever arm 102 and stylus 104 are mounted. In this way, probe holder 114, in particular the first piezo stack 147, will also have sufficient travel available, toward and away from the sample, to be able to move the probe rapidly in the Z direction to provide the fastest Z actuation possible. This ensures that the stylus will be able to accurately follow even the smallest surface features at high scan rates. Importantly, it will do so without inducing parasitic oscillations into the remainder of the apparatus because the second piezo stack 151 balances the momentum of the first piezo stack 147.

FIG. 9 is a schematic illustrating another embodiment of a method and apparatus for characterizing the surface 106 of the sample 108 shown in FIG. 1. The illustrated apparatus (FIG. 9), in operation, includes the XYZ actuator 100 (FIG. 2), wherein the Z actuator portion 122 of the XYZ actuator 100 is extendable both toward and away from the sample 108, alternatively, for characterizing the surface 106 of the sample 108.

Also, as discussed above in connection with FIG. 8, a light beam 189 from a source (not shown) reflects off the cantilever arm 102 of the holder 114, and passes to the detector 190, for determining either the displacement or the amount of oscillation of the cantilever arm 102 for controlling the relative force or distance between the sample surface 106 and the stylus 104.

Further in that regard and for that purpose, FIG. 9 depicts a non-nested parallel feedback system comprising the novel probe holder 114 discussed above, the detector 190, amplifier 196A, difference amplifier 197A, high and low pass filters 200 and 202, and first and second control devices 192A, 194A. The components of the non-nested parallel feedback system (FIG. 9) are substantially as described above in connection with the nested feedback control system (FIG. 8), except as follows.

The first control device 192A has as its input the error signal from difference amplifier 197A which has been high pass filtered by high pass filter 200. The output of the first control device 192A is fed through an amplifier 198A to the piezo stack 147 to move the stylus 104 at a first predetermined rate either toward or away from the sample surface 106.

The second control device 194A has as its input the error signal from difference amplifier 197A which has been low pass filtered through low pass filter 202. The output of the second control device 194A is fed to the Z actuator 122 for causing the Z actuator 122 to move the stylus 104 at a second predetermined rate either toward or away from the sample surface 106.

In operation, the first control device 192A produces a first control signal in response to the higher frequency components of the error signal from the high-pass filter 200, for causing the distal ends 148, 152 of the first and the second members 146, 150 (FIGS. 6, 7) either to extend or retract, for moving the stylus 104 relative to the sample surface 106 (FIG. 1) within a range of 1 micron and at a rapid rate. The second control device 194A produces a second control signal in response to the lower frequency components of the error signal from the low-pass filter 202, for moving the stylus 104 toward or away from the sample surface 106, within a range of 15 microns at a slower, conventional rate.

In this regard, the outputs of the first and second control devices 192A and 194A cooperate to move the stylus to the appropriate height above the sample, through their respective Z actuators (piezo stack 147 and Z actuator 122, respectively), and with sufficient rapidity to ensure accurate measurement even at higher scan rates.

As those skilled in the art can well appreciate, the first and second control devices 192, 192A, 194, 194A for the nested feedback control and non-nested parallel feedback control system may be micro computers or microprocessors, as desired.

The invention thus allows relatively rapid high-precision sample scanning and characterization, resulting in significantly faster sample tracking than conventional systems can provide, without undesired system resonance and attendant system instability.

What has been illustrated and described herein is a balanced momentum probe holder that can be used in a nested feedback control system or in a non-nested parallel feedback control system. However, as the balanced momentum probe holder system has been illustrated and described with reference to several preferred embodiments, it is to be understood that the invention is not to be limited to these embodiments. In particular, and as those skilled in the relevant art can appreciate, functional alternatives will become apparent after reviewing this patent specification. Accordingly, all such functional equivalents, alternatives, and/or modifications are to be considered as forming a part of the present invention insofar as they fall within the spirit and scope of the appended claims.

I claim:

1. Apparatus for characterizing a surface of a sample with a probe, the apparatus comprising:
   an actuator;
   a first member carried by the actuator and having a distal end which is extensible and retractable relative to the surface;
   a second member carried by the actuator and having a distal end which is extensible and retractable relative to the surface;
   a detector that produces a signal corresponding to the location of the probe relative to the surface;
   a first control device operatively connected to the detector and the first and second members which causes the distal ends of the first and second members to extend or retract substantially synchronously and in response to the detector signal, for moving the probe at a first rate relative to the surface; and
   a second control device operatively connected to the first control device and the actuator for causing the actuator to move the probe at a second rate relative to the surface, wherein the first rate is greater than the second rate.

2. The apparatus as defined in claim 1 further comprising an actuator movable both toward and away from a sample.

3. The apparatus as defined in claim 1 further comprising a mount assembly carried by the distal end of the first member, wherein the mount assembly comprises (i) a probe mount and (ii) a cantilever probe having a fixed end carried by the mount and including a stylus spaced from the fixed end and disposed toward the sample; and further comprising a counterbalance carried by the distal end of the second member.

4. The apparatus as defined in claim 1 wherein the momentum of the first member and mount assembly together is balanced by the momentum of the second member and counterbalance together.

5. The apparatus as defined in claim 1 wherein the mass of the first member and mount assembly together is substantially the same as the mass of the second member and counterbalance together.

6. The apparatus as defined in claim 1 wherein the mass of the first member and mount assembly together is not the same as the mass of the second member and counterbalance together.

7. The apparatus as defined in claim 1, wherein the first and second control devices are proportional, integral, derivative controllers.

8. The apparatus as defined in claim 1 wherein the first control device produces a first control signal in response to the detector signal for causing the distal ends of the first and second members either to extend or retract, and wherein the first control signal causes the second control device to produce a second control signal for moving the actuator relative to the sample surface.

9. The apparatus as defined in claim 8 wherein the second control device produces a second control signal if the signal produced by the detector is not reduced to zero by the first control device.

10. The apparatus as defined in claim 8 wherein the first member has a range of motion and wherein the first control device and the second control device maintain the first member in substantially the middle of its range.

11. The apparatus as defined in claim 1, wherein the first control device produces a first control signal in response to the detector signal for moving the probe relative to the sample surface within a range of 1 micrometer, and wherein the first control signal causes the second control device to produce a second control signal for moving the actuator relative to the sample surface within a range of 15 micrometers.

12. Apparatus for characterizing a surface of a sample with a probe, the apparatus comprising:
  an actuator;
  a first member carried by the actuator and having a distal end which is extensible and retractable relative to the surface;
  a second member carried by the actuator and having a distal end which is extensible and retractable relative to the surface;
  a detector that produces a signal which corresponds to the location of the probe relative to the surface of the sample;
  a first control device operatively connected to the detector and the first and second members for causing the distal ends of the first and the second members to extend or retract in response to the detector signal, for moving the probe at a first rate relative to the surface, wherein the distal ends of the first and the second members substantially synchronously either both extend or both retract in response to the signal from the detector; and
  a second control device operatively connected to the detector and the actuator for causing the actuator to move the probe at a second rate relative to the surface, wherein the first rate is greater than the second rate.

13. The apparatus as defined in claim 12, wherein the first control device is a proportional, integral, derivative controller, wherein the second control device is a proportional, integral, derivative controller, and wherein the first control device provides relatively quicker response to the first and second members than the second control device provides to the actuator.

14. The apparatus as defined in claim 12, further including (i) a high-pass filter operatively connected to the detector and to the first control device for providing relatively higher frequency signals to the first control device and (ii) a low-pass filter operatively connected to the detector and to the second control device for providing relatively lower frequency signals to the second control device, wherein the first control device produces a first control signal in response to the higher frequency signals for causing the distal ends of the first and the second members either to extend or retract, and wherein the second control device produces a second control signal in response to the lower frequency signals for causing the actuator to move toward or away from the sample surface.

15. The apparatus as defined in claim 12, further including (i) a high-pass filter operatively connected to the detector and to the first control device for providing relatively higher frequency signals to the first control device, and (ii) a low-pass filter operatively connected to the detector and to the second control device for providing relatively lower frequency signals to the second control device, wherein the first control device produces a first control signal in response to the higher frequency signals for causing the distal ends of the first and the second members either to extend or retract, for moving the probe relative to the sample surface within a range of approximately 1 micron, wherein the second control device produces a second control signal in response to the lower frequency signals for causing the actuator to move toward or away from the sample surface, for moving the probe relative to the sample surface within a range of approximately 15 microns, and wherein the lower frequency signals and the higher frequency signals cooperate to drive the probe toward the sample surface.

16. A method of reducing parasitic oscillations in an apparatus having a probe which interacts with the surface of a sample and which is moved relative to the surface by a fast Z actuator and by a slow Z actuator, the method comprising:
  converting a signal related to the position of the probe into a first control signal fed to the fast Z actuator which moves the probe at a first rate;
  converting the first control signal into a second control signal which is fed to the slow Z actuator which moves the probe at a slower rate; and
  balancing the momentum of the fast Z actuator so that the net momentum of the fast Z actuator is essentially zero.

17. The method as defined in claim 16 wherein the second control signal is zero if the first control signal is reduced to zero by the probe moving at a first rate.

18. The method as defined in claim 16 wherein the momentum is balanced by moving a mass equal to the mass of the fast Z actuator at a velocity equal to the velocity of the fast Z actuator and in a direction opposite that of the fast Z actuator and synchronously therewith.

* * * * *